United States Patent [19]
Dow et al.

[11] 3,919,377
[45] Nov. 11, 1975

[54] PRODUCTION OF TAPES AND FIBROUS MATERIALS

[75] Inventors: James Dow, Thaxted; Ronald Lloyd, Sawbridgeworth; Albert George Patchell, Welwyn Garden City, all of England

[73] Assignee: Smith & Nephew Polyfabrik Limited, Lancashire, England

[22] Filed: Dec. 11, 1972

[21] Appl. No.: 314,064

Related U.S. Application Data

[63] Continuation of Ser. No. 50,189, June 26, 1970, abandoned.

[30] Foreign Application Priority Data
June 27, 1969 United Kingdom............ 32758/69

[52] U.S. Cl............. 264/147; 264/151; 264/210 R; 264/284; 264/DIG. 47
[51] Int. Cl.²......................................... B29H 7/18
[58] Field of Search............ 264/147, DIG. 47, 284, 264/293

[56] References Cited
UNITED STATES PATENTS

| | | |
|---|---|---|
| 2,489,951 | 11/1949 | Bump............................... 264/177 |
| 3,594,870 | 7/1971 | Schippers........................... 264/145 |
| 3,608,042 | 9/1971 | Rasmussen......................... 264/147 |
| 3,641,760 | 2/1972 | Keuchel............................. 264/147 |
| 3,672,013 | 6/1972 | Vernon et al................. 264/DIG. 8 |
| 3,697,636 | 10/1972 | Skovdstewski et al........... 264/147 |
| 3,746,607 | 7/1973 | Harmon et al..................... 264/147 |
| D788,681 | 9/1869 | Johnson et al..................... 264/147 |

*Primary Examiner*—Jay H. Woo
*Attorney, Agent, or Firm*—David G. Conlin

[57] ABSTRACT

A hot melt film of cold-drawable thermoplastic polymer is fed through nip means between co-operating members at least one of which is a roller at a temperature below polymer melting point, the nip means being such as to produce shear in the film as between the two film surfaces, and including grooving means for at least one such surface, whereby a profiled sheet preferably having longitudinal grooves is produced of a nature which splits readily when stretched and may produce multi-filamentary yarn of crimped fibres.

13 Claims, 4 Drawing Figures

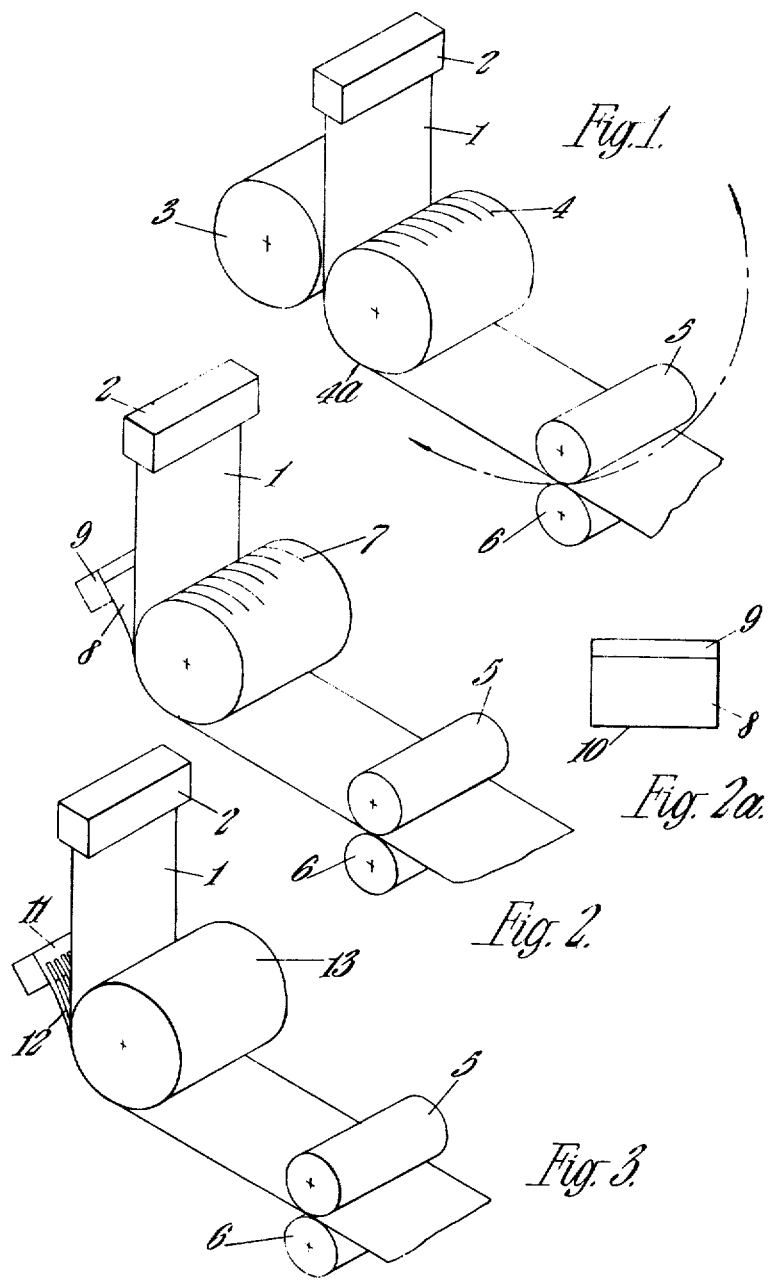

PRODUCTION OF TAPES AND FIBROUS MATERIALS

This is a continuation of application Ser. No. 50,189, filed on June 26, 1970 and now abandoned.

This invention relates to the production of films, tapes and fibres, especially multifilamentary yarn, of cold-drawable thermoplastic polymeric material. The terms "film" and "sheet" are used interchangeably in this specification notwithstanding any commercial usage to the effect that "sheet" is the heavier gauge material often provided in discrete lengths.

Synthetic textiles require the production of high quality smooth fine denier filaments. The conventional way of ensuring this is by extrusion of a group of monofilaments from a spinneret, but this needs highly specialized and expensive equipment to get a high quality fibre.

It is known to twist stretched and fibrillated plain tape films for direct production of yarns. However, such yarns are usually coarse and uneven and, while suitable for twines and cords, are not suitable for the better-quality textiles.

The present invention relates in one aspect to fibrillation of a stretched polymer tape which is embossed or profiled in a predetermined pattern so that controlled splitting into a smooth uniform multifilamentary yarn is achieved. Moreover, the present invention can provide such a yarn which possesses an inherent curl or crimp of a permanent nature rendering it more acceptable as a textile material, i.e. providing suitable texture, bulk and handle.

The invention also relates to a film or tape of polymeric fibre-forming material having substantially parallel longitudinal grooves on at least one face and having different physical characteristics across the thickness resulting from shear as between the two faces of the film the relative thickness at the bottoms of the grooves being such that the tape splits preferentially in the grooves on stretching, and (preferably) being less than 20 $\mu$. Because of these properties in the sheet it can be readily fibrillated to produce a crimped filamentary material. In some cases, as will be described in more detail below, the groove need not have a particular thickness provided that there is a line of weakness running up the groove.

The invention consists in a method of producing an extended area of cold-drawable thermoplastic polymer in the form of a sheet or tape, wherein a hot melt film of the material is fed through nip means between co-operating members at least one of which is a roller at a temperature below polymer melting point the nip means being such as to produce shear in the film as between the two film surfaces, and including grooving means for at least one such surface.

The "nip means" referred to above can be constituted as a single nip between two co-operating members, as described below, or as one nip for grooving the film and another separate nip for producing shear, in either order.

At least one co-operating member is preferably at a different temperature from at least one other, and usually one such member is at or above the polymer melting point.

While the invention can be applied to produce any configuration of grooves on the film, (e.g. transverse or angled grooves of various cross-sectional shapes) it is preferred to form the nip means in such a way as to provide uniform longitudinal grooves.

By "shear as between the surfaces" we mean that, in broad terms, the shear conditions on one face are different from the shear conditions of any on the other face. Such shear conditions can be across the whole surface uniformly, or can differ within the face itself, e.g. as between the bottom of the grooves or the sides of the grooves or the top of the intermediate ridges. It seems likely that shear at the base of the grooves leads to easier subsequent splitting and fibrillation while shear elsewhere in the groove leads to crimping. These effects are latent in the profiled sheet, thereby making it a valuable article of commerce from which fibres can readily be formed by fibrillation which in many cases are inherently crimped.

The film to which the method of the invention is applied is preferably from 1 to 20 thousandths of an inch (40 to 800$\mu$) in thickness.

Although various arrangements are possible the method includes three preferred forms.

In a first form the nip is formed by two rollers including a cooler roller below polymer melt temperature with circumferential annular grooves and a hotter roller with a smooth surface the rollers rotating at different speeds. Where reference is made to different rolling speeds, it will be understood that peripheral speed of the roller is meant. For example, especially if polypropylene is to be used, the grooved roller can be used at 0° – 90°C and the smooth roller used at from 0° – 250°C. Preferred temperatures for this material are 70°C for the grooved roller and 170°C for the smooth roller.

Usually the smooth roller is above the polymer melting point and the grooved roller sufficiently below the melting point that location of the grooved film passing through the nip on the grooved roller is maintained. These temperatures can be from 0° – 250°C for the cooler roller and 0° – 300°C for the hotter roller. Since the rollers do not rotate at the same peripheral speed, (and speeds within the range of ratios 1:3 to 3:1 are preferred, although if necessary one roller can be stationary) and especially if the hotter roller is the slower, a drag or shear on the hotter surface is produced as between the surfaces. This leads to crimped fibres when the film or tape is eventually stretched and fibrillated and heat-relaxed.

The reason for this is the change in alignment of the molecular chains in the layer of polymer nearest the hotter roller in relation to the longitudinal alignment in the remainder of the film.

In a second form the nip is provided between a cooler grooved roller below polymer melt temperature and a doctor blade, which can have a straight edge or serrated edge. This blade will become heated, and may also be heated (or cooled) additionally. It creates a shear effect on the surface of the film in contact with the blade leading eventually to crimp in the fibres as before.

In a third form the nip is provided between a cool smooth roller below polymer melt temperature and the points of at least one comb composed of one or more rows of needles, or possibly the points of a serrated doctor blade, or similar profiling member past which the film is dragged to produce grooves. As before with the doctor blade, these needles may be heated or cooled additionally. These needles become heated by the passage of the hot melt and form grooves in the tape, with the possibility of the groove sides or bottoms closing together. Various arrays of needles (possibly staggered in relation to one another) and oscillation of needles, are also possible in this form of the invention.

Certain preferred features are common to all of the above. Thus, the roller grooves, or needles, may have a spacing of from 5 to 500 per inch, and preferably from 50 to 300 per inch.

In a modification (especially when a needle comb is used) the "sheet" can be penetrated by the needles rather than merely grooved. However, it still proceeds through the equipment as a sheet-like expanse of polymer.

In numerical terms, the "membranes" at the bases of the grooves are preferably less than 20 $\mu$, and usually less than 10 $\mu$ thick. Thicknesses of 5 $\mu$ are easily achieved.

While any fibre-forming thermoplastic polymer may be used, suitable polyolefins such as polypropylene or high density polyethylene (or blends thereof), polyamides e.g. nylon, polyesters such as polyethylene terephthalate acrylonitrile polymers, or polyvinylidene chlorides are of particular utility.

It will be apparent that certain of the expedients discussed above can be used in combination. For example, a cooled grooved roller can be used with a hotter smooth roller at the same peripheral speed to provide grooves but not shear as between the two faces, and a blade or conceivably a bar with a small radius edge or a small radius roller can be located further around the periphery of the grooved roller to provide a nip to give shear as the sheet is removed from the grooved roller.

While the sheet or tape as produced by the method above is a potential product per se, it is also envisaged to combine the above steps with stretching such a sheet, more especially in tape form, in free flight (e.g. directly from the film carrier roller) and/or over a heated surface and then fibrillating to form a multi-filamentary yarn or like material. Such stretch can be up to 2000%.

When required a subsequent heat-relaxation step can be added to develop a crimp in the yarn of essentially helical configuration.

Such a multi-filamentary yarn comprises a predetermined number of smooth monofilaments characteristic of fibrillation from a stretched grooved film tape and generally has an inherent permanent essentially helical occasionally self-reversing crimp along its length.

In another aspect the invention provides apparatus for producing an extended area of cold-drawable thermoplastic polymer comprising: an extruder having a flat die to extrude a film of polymer in molten form; and co-operating members defining nip means into which the extruded film can pass, at least one co-operating member being a roller, at least two co-operating members being adapted to provide shear as between one face and the other of the film, grooving means being provided on at least one co-operating member for grooving the extruded film.

The invention will be further described with reference to the accompanying drawings, FIGS. 1, 2, 2a and 3 of which show in a diagrammatic form three arrangements for producing a grooved sheet according to the invention.

In FIG. 1 a hot melt is extruded as a film 1 from extruder 2 and passes through the nip between rollers 3 and 4 and away between rollers 5 and 6. In this, as in the subsequent figures, the sheet can be considered as passing thereafter simultaneously or successively through a stage in which it is split into tapes, a stretching stage, a stage where the stretched tapes are fibrillated into a multi-filamentary material, e.g. by mechanical means or an air venturi, a heat-relaxation step to develop crimp and a wind-up stage. All of these expedients are well-known in this field for treatment of extruded profiled sheet and are accordingly not specifically shown.

Roller 4 is a relatively cool roller below polymer melt temperature provided with circumferential annual grooves to give the film complementary longitudinal ribs and grooves on one side. Roller 3 is a smooth heated roller. As shown in FIG. 1 the film coming from the extruder passes directly into the nip between the rollers 3 and 4, although this can be replaced by feed of film at an angle, allowing the film to contact one or other roller before passing through the nip.

The rollers can rotate at the same speed if it is only desired to produce grooves but not shear, but usually the drive to the rollers 3 and 4 is such as to provide a speed differential between the rollers by suitable gearing. Such a speed differential can for example be such that roller 3 rotates more slowly than roller 4 (for example at a 10% lower peripheral speed) but may also be such that the roller 3 rotates more quickly than roller 4.

The rollers 5 and 6 can be driven at the same peripheral speed as roller 4 (or 3) but there is considerable advantage to be gained by higher speeds so as to stretch the film.

The chain-dotted arcuate line in FIG. 1 (FIGS. 2 and 3 could be similarly modified) indicates that rollers 5 and 6 can be mounted on a swingable arm or bracket so that the film becomes more or less stretched while in contact with a greater or smaller area 4a of roller 4. Possibly no contact at all, i.e. vertical draw of the grooved sheet, could be used, although indications are that some contact at 4a is desirable.

The effect of this arrangement is that a sheet material is obtained having parallel longitudinal ribs and grooves alternately. Such a sheet can of course be obtained as a plurality of multigrooved tapes (say, 25 grooves per tape) by methods or equipment known in themselves, especially by dividing while the sheet is still in contact with the roller. The grooves can be considered as thin membrances which, as described in more detail below, rupture on stretching and, preferably, suitable handling.

The differential speed of rollers 3 and 4 gives shear as between the two surfaces of the film, which has advantageous consequences as described in more detail below.

While the invention is not limited to any dimensions of film or roller, or to particular materials, the following have been found suitable by way of specific examples.

| | |
|---|---|
| Extrusion Temperature | 250°C |
| Die width | 20 inches |
| Die gap | .015 inches |
| Material | polypropylene, melt flow index 3.0 |
| Grooves | 100 per inch, .01 inches deep |
| Roller diameter | 5 inches |
| Roller temperatures | Roller 4, 70°C; Roller 3 170°C |
| Roller peripheral speed | (a) Roller 4, 20m/min Roller 3, 2m/min. |

-continued

|  |
|---|
| less, i.e. 18m./min.<br>or (b) In combination<br>with (a)<br>Rollers 5 and 6 at<br>25 m./min. |

In FIG. 2, the hot melt 1 from extruder 2 passes through the nip between cool roller 7, at 90°C and doctor blade 8 supported on backing plate 9. The blade 8 is in this instance a flexible strip of metal with a sharp edge 10 (FIG. 2a) and contacts the roller 7 as a trailing blade, in the example shown being at an angle of about 30° with the vertical plane in which the film 1 is fed.

Since the film is hot, the blade 8 will become heated during the operation of the equipment. It may if desired be provided with additional heating or cooling.

Once again, rollers 5 and 6 may be run at higher speeds to provide a stretching effect round the base of roller 7.

The blade can be say 0.75 inches deep and 0.010 inches thick for use with a 5 inch diameter roller.

The force at which the blade can be applied to the roller varies but is usefully about four pounds per linear inch of contact. Other dimensioning, speeds and features of the equipment are as specified above in relation to the embodiment using two rollers.

It will be clear to the man skilled in the art that if rollers 3 and 4 rotate at the same speed a shear effect can be obtained by combining these rollers with a blade as shown at 8 of FIG. 2, or more preferably a somewhat stouter blade than this flexible doctor blade, around which the film is taken off and stretched.

FIG. 3 shows an embodiment where the doctor blade 8 of FIG. 2 is replaced by a needle comb 11 comprising 100 needles per inch referenced by 12, the whole comb being of a similar length to roller 13, which is in this instance a smooth roller below melting point and pressing against the roller at a force of 4 pounds per linear inch. A typical length for the roller is 18 inches. The needles 12 are 0.010 inch shank diameter, 1 inch long, 0.25 inch taper, of round cross-section, and soldered to a brass bar.

The equipment of FIGS. 1 to 3 in each case produces grooved film, or tape divided from such film, having different characteristics at different surfaces as a consequence of the shear. The desiderata for such film are:
  i. The membrane between the ribs should preferably be less than 10 $\mu$ thick, and even down to less than 5 $\mu$. In fact it is within the scope of the invention to penetrate the film and produce a "sheet" of parallel filaments. This depends to some extent on the pressure and temperature between the co-operating elements forming the nip, and is more readily achieved with the needles of FIG. 3.
  ii. The structure through the film thickness and towards the two surfaces of the film should differ because of the shear effect in the polymer where it is dragged by or over the roller 4 (FIG. 1) the blade 8 (FIG. 2) or the needle comb 11 (FIG. 3).

The film (or tape), itself a potential article of commerce, can then be stretched by methods known per se in this art. While it is possible to use pre-wound film or tapes for stretching it will obviously be very convenient to stretch tapes as issuing from rollers 5 and 6, or even as coming from a blade or small-radius edge adjacent to roller 4.

The crimp can be accentuated by stretching the tape over such a blade instead of in free flight.

On stretching the tapes the membranes between the ribs tend to split spontaneously to provide long multi-filamentary materials containing long smooth filaments corresponding to the number of ribs present in the tape. The filaments tend to give a smooth more uniform yarn than the rough fibrillated structure obtained from splitting a tape not containing ribs separated by membranes.

Moreover, the shear through the film thickness is conducive to the eventual formation of a permanent helical crimp in the multi-filamentary material. This crimp is occasionally self-reversing so that no resultant torque is present in a yarn of the multi-filamentary material.

By way of specific example, the doctor blade equipment shown in FIGS. 2 and 2a was utilised to produce a sheet 112 $\mu$ thick, with membranes of less than 10 $\mu$ thickness. It was stretched as a 25-groove tape at 145°C, in free flight, by 1100%. Conventional air fibrillation (by passing the stretched tape through an air venturi passage) led to a high degree of fibrillation and when the resulting multi-filament yarn was allowed to relax in the free state for 24 hours the following results were obtained:

| Approximate denier of filaments | 13 |
|---|---|
| Crimp per centimetre<br>(of subsequently<br>extended yarn) | 0.7 |
| Crimp rigidity, % | 3.6, 2.5 |
| Tenacity, g./den. | 5.0 |

A similar experiment but with a stretch to 500–600% gave the results:

| Denier | 19 |
|---|---|
| Crimp/cm. | 0.4 |
| Crimp Rigidity | 2.2, 3.2 |
| Tenacity | 4.5 |

Another similar experiment using the needle comb (100 pins per inch) of FIG. 3 gave:

| Denier | 50 |
|---|---|
| Crimp/cm. | 0.3 |
| Crimp Rigidity | 1.9 |
| Tenacity | 4.7 |

(Crimp rigidity is expressed as the percentage retraction of the yarn between successive loadings of 0.1g./den and 0.002g./den).

Various modifications are possible within the scope of the invention and do not necessitate separate figures of drawing for the man skilled in the art. For example, the film may include two or more polymers of a degree of mutual incompatability which facilitates splitting into filaments. Laminated films can be used, by the incorporation of additional extruders feeding films into a common nip or by the use of a preformed sheet, e.g. fed over the smooth roller as a backing to the material being grooved by the needles. If a grooved roller is used, auxiliary grooves or like patterning can be incorporated for texturising. Moreover, different effects may be obtained with different film thicknesses and/or different shear conditions; a thicker film may still be given enough shear to improve fibrillation at the bottom of

We claim:

1. A method of producing a fibrous material from a thermoplastic polymer, said method consisting essentially of the steps of (1) melting said polymer and extruding the same as hot continuous molten film thereby defining an extrusion direction in the film, (2) passing said hot continuous molten film as a preformed film into a film treating zone, (3) within said film treating zone applying a dragging force across one surface of said free, preformed extruded film, (4) within said film treating zone simultaneously forming longitudinal spaced parallel uninterrupted grooves in at least one surface of said film, said grooves separated by longitudinal ribs, said grooves and ribs extending in the direction of extrusion, (5) removing the grooved film from said film treating zone and stretching said film to split it into tapes and to split the tapes along said grooves to form filaments, and (6) allowing the stretched filaments to relax.

2. A method of producing a fibrous material from a thermoplastic polymer, said method consisting essentially of the steps of (1) melting said polymer and extruding the same as a hot continuous film thereby defining an extrusion direction in the film (2) passing the hot molten film as a free, preformed film into a film treatment zone (3) within said film treatment zone applying a drag force across one surface of said free, preformed extruded film which frictionally retards movement of the one surface relative to the other surface, (4) within said film treating zone extracting sufficient heat from said other surface of said free, preformed extruded film to solidify the film (5) within said film treating zone simultaneously forming spaced parallel longitudinally extending uninterrupted grooves in at least one surface of said film, said grooves being separated by longitudinal ribs, said grooves and ribs extending in the direction of extrusion, (6) removing the grooved film from said film treating zone, splitting the film into tapes by stretching and further splitting the tapes into filaments and (7) allowing the stretched filaments to relax.

3. The method of claim 1, where the film thickness at the bottom of the grooves is less than 10 microns.

4. The method of claim 1, where the degree of stretch is up to 2000%.

5. The method of claim 1, where the polymer is selected from the group consisting of polypropylene, polyethylene, polyamide, polyester, polyacrylonitriles, polyvinylidene chloride and blends thereof.

6. The method of claim 1, where the grooves are formed on the surface of the film where the dragging force is applied.

7. The method of claim 1 where the grooves are formed on the surface of the film opposite from that where the heat is extracted.

8. The method of claim 6 where the dragging force is applied across the whole surface of the film.

9. The method of claim 6 where the dragging force is applied only within the grooves.

10. The method of producing a fibrous material from a thermoplastic polymer, said method consisting essentially of the steps of (1) melting said polymer and extruding the same as a hot continuous molten film thereby defining an extrusion direction in the film (2) passing the hot continuous molten films as a free preformed film into a film treating zone (3) applying a shearing force to the opposed surfaces of the film so as to stress the film between said surfaces in planes parallel to said surfaces (4) within said film treating zone extracting sufficient heat from one surface of said free, preformed extruded film to solidify the film while the shearing stress continues to be applied thereto (5) within said film treating zone simultaneously forming longitudinally extending uninterrupted grooves in at least one surface of said film, the grooves being separated by longitudinally extending ribs, said grooves and ribs extending in the direction of extrusion (6) removing the grooved film from said film treating zone and stretching the film to split it into tapes and to split the tapes into filaments and (7) allowing the stretched filaments to relax.

11. The method of producing a bulky multifilament yarn containing inherently crimped fibers from a cold drawable thermoplastic polymer, said method consisting essentially of the steps of melting said polymer and extruding the same as a hot continuous molten film thereby defining an extrusion direction in the film, passing the hot continuous molten film as a preformed film into a film treating zone, applying a shearing force to the film parallel to the plane of its opposed surface across the entire width of the film, forming longitudinally extending uninterrupted grooves in at least one surface of the film, said grooves being separated by longitudinal ribs and extending in the direction of extrusion, subjecting one side of the film to a temperature lower than the other to effect cooling to produce a solid sheet in which the shearing stresses are imprisoned in the grooves and ribs in varying degrees in planes parallel to the surfaces, removing the grooved film from said film treatment zone and stretching the film to split it into tapes and to split the tapes into filaments and allowing the stretched filaments to relax.

12. A method according to claim 10 comprising applying the shearing stresses to the molten film while moving it between a smooth surface at one side and a rolling surface on the other side and wherein the smooth surface is maintained at a temperature above the melting point of the polymer and the grooved surface is maintained at a temperature below the melting point of the polymer.

13. A method according to claim 12, wherein the rolling surface contains transversely thereof grooves and ribs.

* * * * *